(12) United States Patent
Hill et al.

(10) Patent No.: US 8,372,502 B2
(45) Date of Patent: Feb. 12, 2013

(54) STRUCTURES FOR CONTAINING LIQUID MATERIALS AND MAINTAINING PART ALIGNMENT DURING ASSEMBLY OPERATIONS

(75) Inventors: Matthew Hill, Mountain View, CA (US); Trent Weber, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 328 days.

(21) Appl. No.: 12/753,005

(22) Filed: Apr. 1, 2010

(65) Prior Publication Data
US 2011/0244165 A1    Oct. 6, 2011

(51) Int. Cl.
  B32B 3/02    (2006.01)
  B32B 9/00    (2006.01)
  B32B 33/00   (2006.01)
  B32B 3/10    (2006.01)
  B32B 37/00   (2006.01)
  B32B 38/04   (2006.01)
  B29C 65/00   (2006.01)
  B31B 1/60    (2006.01)
(52) U.S. Cl. ............... 428/66.6; 428/40.1; 428/40.2; 428/134; 428/354; 156/60; 156/275.7
(58) Field of Classification Search ............... D16/200; 428/66.6, 354, 134
See application file for complete search history.

(56) References Cited

U.S. PATENT DOCUMENTS

| | | | |
|---|---|---|---|
| 5,541,367 A | 7/1996 | Swamy | |
| 5,948,175 A | 9/1999 | Glenn | |
| 6,437,669 B1 | 8/2002 | Welstand et al. | |
| 6,867,504 B2 | 3/2005 | Lichtenwalter et al. | |
| 7,012,189 B2 | 3/2006 | Kriege et al. | |
| 7,310,872 B2 | 12/2007 | Kriege et al. | |
| 7,589,402 B2 * | 9/2009 | Fujiwara | 257/675 |
| 7,636,244 B2 | 12/2009 | Kriege et al. | |
| 2007/0126117 A1* | 6/2007 | Fujiwara | 257/723 |
| 2007/0221978 A1* | 9/2007 | Tsuji | 257/306 |
| 2007/0254117 A1* | 11/2007 | Graydon et al. | 428/34.1 |

OTHER PUBLICATIONS

Author Unknown, Pyralux Web Page Historical Archive, Feb. 10, 2007, Dupont.*
Anders S.G. Andrae, Norhiro Itsubo, Hiroshi Yamaguchi, 2007, Conductive Adhesives vs Solder Paste: A Comparative Life Cycle Based Screening, Abstract, taken from the Google eBook "Advances in Life Cycle Engineering for Sustainable Manufacturing", p. 285.*
U.S. Appl. No. 12/571,295, filed Sep. 30, 2009, Zadesky.

* cited by examiner

Primary Examiner — David Sample
Assistant Examiner — Nathan Van Sell
(74) Attorney, Agent, or Firm — Treyz Law Group; G. Victor Treyz; Kendall P. Woodruff (57) ABSTRACT

Components may be interconnected using liquid materials such as liquid adhesive and solder. To prevent undesired movement between the components during the assembly process and to prevent the liquid material from flowing into undesired areas, an attachment and dam structure may be provided. The structure may be formed from a substrate such as a flexible polymer film coated with adhesive. When interposed between first and second components, the structure attaches the first and second components and prevents movement between the first and second components. The structure may have one or more edges adjacent to the liquid material to block the liquid material from flowing while the liquid material is in its liquid state. Once the components have been connected, the liquid material can be solidified.

20 Claims, 6 Drawing Sheets

STRUCTURES FOR CONTAINING LIQUID MATERIALS AND MAINTAINING PART ALIGNMENT DURING ASSEMBLY OPERATIONS

BACKGROUND

Liquid adhesive and solder are used in forming mechanical and electrical connections in a variety of contexts. For example, liquid adhesive may be used to attach parts together within an electronic device. Solder connections may be formed when it is desired to mount a component to a printed circuit board.

It can be challenging to properly control liquid materials during manufacturing. Liquid materials such liquid adhesives and solder that are not well controlled may intrude into undesired portions of a workpiece. For example, a liquid material that is not properly controlled may wick into undesired areas between closely spaced parts. This excess material can then interfere with the desired operation of a product. Attempts to reduce undesired movement of intrusions of liquid materials by reducing the volume of liquid material that is used are sometimes counterproductive. Solder joints that are formed without using sufficient solder may be unreliable or may not exhibit satisfactory low-resistance electrical connections. Adhesive joints that are formed without using sufficient liquid adhesive may be weak.

To address these concerns, solder dam and glue dam structures have been developed. These structures use features such as ridges to block the flow of liquid materials during assembly operations and thereby contain adhesive and solder in desired areas.

During assembly operations that involve that involve the use of liquid materials, undesired movements of workpiece parts relative to one another should be avoided. If parts are allowed to move with respect to each other before an adhesive or solder joint has been properly formed, the parts may become permanently misaligned. Unintended movement during assembly is sometimes addressed by providing parts with alignment features such as alignment posts and holes.

Strips of double-sided adhesive tape have been used in conjunction with epoxy when mounting display cover glass panels to housing structures in cellular telephones. In this type of arrangement, rectangular pieces of double-sided tape are used at the upper and lower ends of the display. A peripheral bead of epoxy that is sandwiched between the panels and that is separated from the double-sided tape by a raised housing ridge is used in mounting the panel. In this type of scenario, the double-sided tape does not constrain the flow of the epoxy. Conventional dam structures may help prevent undesired adhesive movements, but do not prevent relative movement between parts before a finished adhesive bond has been formed. This can lead to parts that are tilted or otherwise misaligned with respect to each other.

It would therefore be desirable to provide improved ways in which to use liquid materials in the assembly of parts during manufacturing.

SUMMARY

Components may be interconnected using liquid materials such as liquid adhesive and solder. For example, a trim member may be attached to the surface of a camera module using liquid adhesive or an electronic component may be mounted to traces on a printed circuit board using solder.

To prevent undesired movements between the components during the assembly process and to prevent the liquid material from flowing into undesired areas, an attachment and dam structure may be provided. The structure may be formed from a substrate such as a flexible polymer film coated with adhesive. The structure may have a shape such as a ring shape or other suitable shape. When interposed between first and second components, the structure attaches the first and second components and prevents movement between the first and second components. The structure may have one or more edges adjacent to the liquid material that constrain the locations into which the liquid material can flow while the liquid material is in its liquid state. Once the components have been connected, the liquid material can be solidified.

Further features of the invention, its nature and various advantages will be more apparent from the accompanying drawings and the following detailed description of the preferred embodiments.

DETAILED DESCRIPTION

Electronic devices such as cellular telephones may contain cameras and other components. A camera may have a trim piece that is attached to a camera module base. In connecting components such as camera components and other parts in an electronic device, liquid materials such as liquid adhesive and solder may be used.

Figure 1:
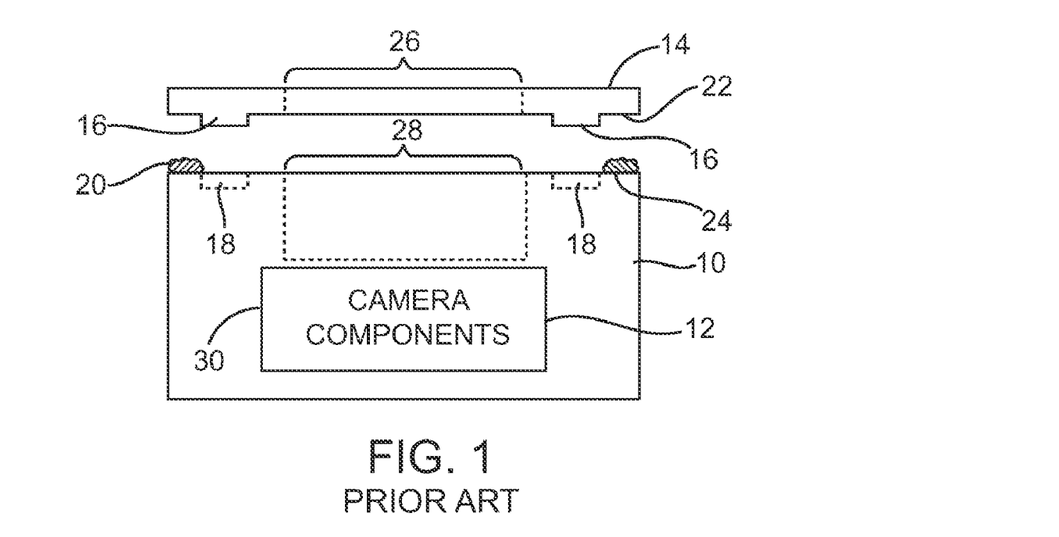
FIG. 1 is a cross-sectional side view of a conventional camera module to which a trim is being attached using adhesive.

A conventional camera module to which a camera trim piece is being attached is shown in FIG. 1. As shown in FIG. 1, camera module base 10 contains camera components 30. Base 10 is typically formed from a housing member such as a cube-shaped structure. Camera components 30 include image sensor components, lenses, and other components. Camera components 30 are aligned with opening 28 in base 10. A trim piece such as trim 14 may be attached to base 10 (e.g., to provide the camera with a finished appearance). Opening 26 in trim 14 is aligned with opening 28 to allow light to enter camera components 30. In a typical configuration, openings 26 and 28 are circular in shape.

Figure 2:
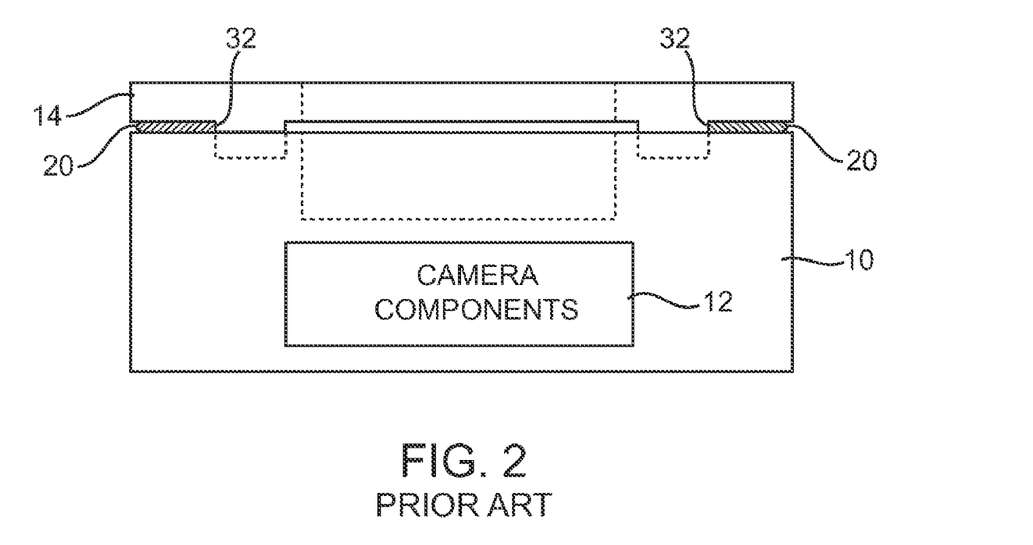
FIG. 2 is a cross-sectional side view of the conventional camera module of FIG. 1 following attachment of the trim.

Trim 14 and camera base 10 have mating alignment features. As shown in FIG. 1, trim 14 has alignment posts 16 and camera base 10 has corresponding alignment holes. Before inserting posts 16 into holes 18, drops of epoxy 20 are placed between upper surface 24 of camera base 10 and opposing lower surface 22 of trim 14. Following insertion of posts 16 into holes 18, epoxy drops 20 are compressed between surfaces 22 and 24. This flattens epoxy 20 and forces epoxy 20 inwards against the ridge edges 32, which serve as a glue dam, as shown in FIG. 2. Epoxy 20 is then cured to bond trim 12 to housing 10.

Conventional camera assembly operations of the type shown in FIGS. 1 and 2 rely on alignment features such as alignment posts and holes, which can add undesired complexity. Alignment features such as alignment posts and mating alignment holes are also generally not able to completely prevent movement between the parts of a workpiece during assembly. As a result, parts such as trim 14 of FIG. 2 may become tilted with respect to base 10 before the epoxy curing process is complete.

Figure 3:
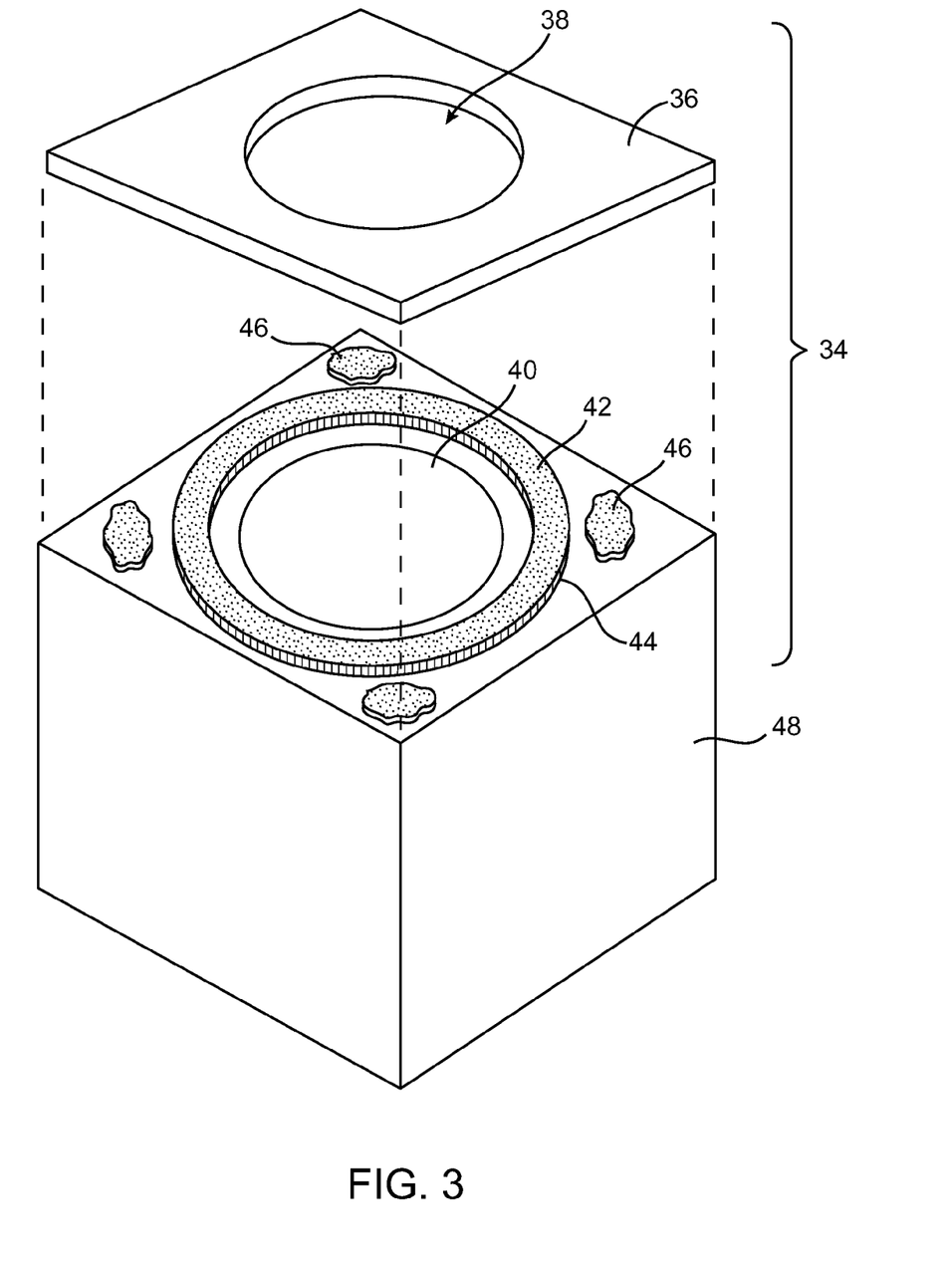
FIG. 3 is a perspective view of a component such as a camera module with a structure for constraining movement of liquid material and for ensuring proper alignment between the component and another component such as a trim piece during assembly in accordance with an embodiment of the present invention.

An arrangement for assembling components using liquid materials in accordance with an embodiment of the present invention is illustrated in FIG. 3. As shown in FIG. 3, a first component (e.g., camera trim 36) may be attached to a second component (e.g., camera module base 48) to form an assembled structure (e.g. camera 34, shown disassembled in the exploded view of FIG. 3). In general, any types of parts may be assembled using liquid materials. For example, structural parts such as housing parts, frame structures, mounting brackets, component housings, and other mechanical parts may be assembled using liquid materials such as liquid adhesive and solder. Electrical components may also be assembled using liquid materials. For example, an electrical component that has conductive terminals may be mounted to mating conductive traces on a printed circuit board using liquid materials such as liquid adhesive, liquid conductive adhesive, and solder. Liquid adhesive materials that may be used for assembling components include epoxy and cyanoacrylate (as examples). Solder joints may be formed by melting solder or by depositing solder paste and reflowing the deposited paste in a reflow oven.

As shown in the example of FIG. 3, the components that are being attached to each other may include a trim structure (trim 36) and a camera base structure (structure 48). In general, any suitable electrical and/or mechanical components may be assembled using liquid materials. The attachment of a trim to a camera housing is merely described as an illustrative example.

As shown in FIG. 3, trim 36 may have an opening such as circular hole 38. Light may pass through hole 38 to lens 40 and other camera components in camera base 48. Electrical components that may be used in camera base 48 include circuitry such as an integrated circuit image sensor that converts received image light into digital image data.

Components such as components 36 and 48 may be formed from glass, plastic, metal, ceramics, or other suitable materials. Liquid material 46 may be used in connecting components 36 and 48. Material 46 may be a liquid adhesive, solder, or other suitable material.

Liquid material 46 solidifies as part of the assembly process. For example, liquid adhesives such as epoxy are initially liquid, which allows the adhesive to coat the surfaces of the parts being joined. Following application of the liquid adhesive to the parts of a workpiece, the liquid is cured to form a completed bond. The curing process may involve application of heat (e.g., heat to maintain the workpiece at room temperature or sufficient heat to raise the workpiece to an elevated temperature). Applying heat for a sufficient amount of time will cause the liquid epoxy to solidify and form a stable bond. Some liquid adhesives are cured (and thereby solidified) by application of ultraviolet light (e.g., UV-cured liquid polymer adhesives such as UV epoxy). Combinations of heat and light can also be used to cure liquid adhesives.

Materials such as solder can initially be solid (e.g., solder wire), can initially be applied as a paste, etc. During solder reflow operations, heat is applied (e.g., to raise the solder to a temperature above 200° C. or more). This causes the solder to melt and form a liquid. The liquid solder flows over exposed metal parts such as the terminals on electronic components and the associated exposed traces (solder pads) on printed circuit boards during reflow operations. When reflow operations are complete, the workpiece is cooled to room temperature and the solder solidifies into a finished solder joint.

To ensure that trim 36 is held in a desired orientation with respect to housing 48 while liquid material 46 is being hardened (e.g., by curing an adhesive or by cooling molten solder), structure 34 may be provided with attachment and liquid dam structure 42. Structure 42 may be formed from a layer of double-sided tape or other material that serves to connect components together. The shape of structure 42 may also allow structure 42 to serve as a barrier to the flow of the liquid material while in its liquid state. Structure 42 may therefore serve both as a dam (i.e., a solder dam or glue dam) and as a attachment structure that holds the workpiece together or at least prevents undesired movement of workpiece components during assembly (i.e., before the liquid material enters its solid state). As part of the assembly process, additional attachment mechanisms may be used to improve the strength of the bond between components in the workpiece. For example, the bond between the components may be strengthened by use of the liquid material (e.g., liquid adhesive).

Structure 42 may include a substrate. Layers of adhesive may be used in attaching structure 42 to the components of the workpiece (i.e., components 36 and 48 in the example of FIG. 3). For example, if structure 42 is provided in the form of a thin disk-shaped member as shown in FIG. 3, adhesive may be provided on the upper surface of structure 42 to facilitate attachment of structure 42 and component 36 and may be provided on the lower surface of structure 42 to facilitate attachment of structure 42 to component 48. The adhesive may be provided using any suitable adhesive-dispensing technique (e.g., spraying, dipping, painting, pad printing, screen printing, etc.). These techniques may be used to apply adhesive to the substrate of structure 42, the surfaces of the workpiece, or both the substrate of structure 42 and one or more surfaces of the workpiece. The substrate in structure 42 may be formed from metal, plastic, ceramic, glass, composites, or other suitable materials. The substrate may be rigid or flexible. Flexible substrates may be used to conform to complex workpiece surfaces during assembly.

With one suitable arrangement, structure 42 may be formed from a sheet of double-sided tape. The tape may have a substrate such as a thin flexible polymer sheet (e.g., polyimide, polyethylene terephthalate, etc.). The polymer sheet may have upper and lower surfaces that are coated with adhesive. During assembly, movement of liquid material 46 may be impeded by the presence of structure 40. For example, in the arrangement of FIG. 3, outer peripheral edge 44 of ring-shaped structure 42 may prevent liquid material 46 from intruding onto lens 40 and other structures within the inner portion of structure 42. The substrate material that is used in forming structure 42 may be chosen to resist expected process temperatures. For example, if liquid material 46 is solder that is being heated to 240° C. (as an example), the substrate material of structure 42 may be chosen to be capable of withstanding damage when exposed to materials at temperatures of 250° C. or less. When liquid material 46 is in its liquid state, it flows up against edge 44 and structure 42 and remains in this position, adjacent to edge 44 and structure 42 when liquid material 46 enters its solid state (e.g., when liquid adhesive cures or when solder solidifies).

Structure 42 may be attached to one or both of the components in a workpiece by hand or using an automated positioning tool. As an example, structure 42 may be attached to the lower portion of apparatus 34 (i.e., component 48) by hand (or using an automated tool) before an automated tool (or hand assembly) is used in attaching upper component 36 to component 48.

Figure 4:
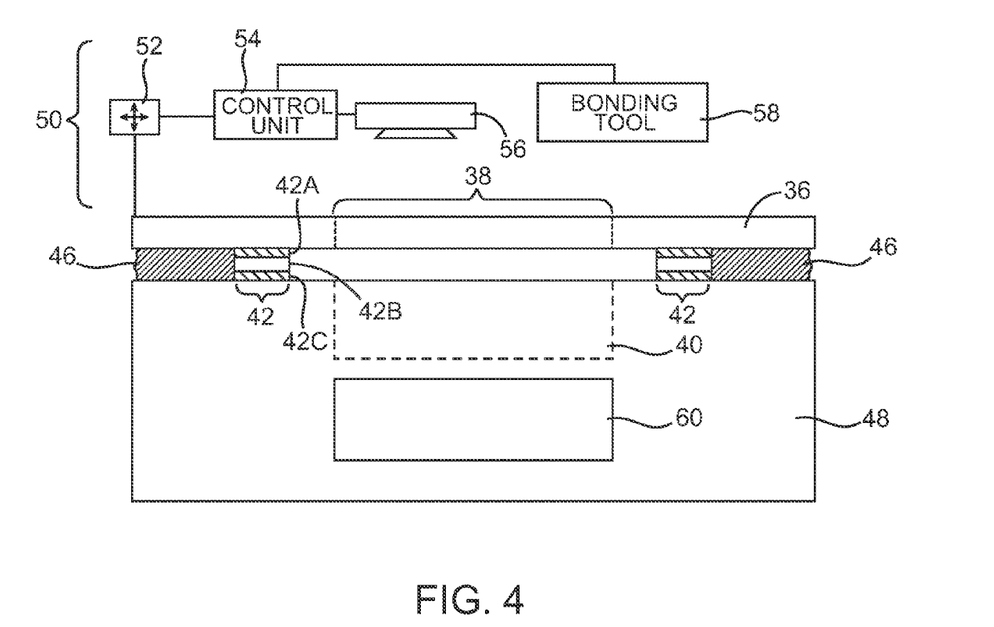
FIG. 4 is a cross-sectional side view of components of the type shown in FIG. 3 during assembly in accordance with an embodiment of the present invention.

Consider, as an example, the use of the automated assembly system (system 50) of FIG. 4. As shown in FIG. 4, assembly tool 50 may include a computer-controlled actuator such as actuator 52. Actuator 52 may hold component 36 and/or component 48, so that the position of component 36 relative to component 48 may be adjusted. Tool 54 may have a control unit such as control unit 54. Control unit 54 may include a computer or other suitable computing equipment that issues control commands for actuator 52. One or more cameras such as camera 56 may be used to gather images for control unit 54. Control unit 54 may use gathered image data or other feedback to determine how to adjust the relative position of components 36 and 48 relative to each other. Once component 36 has been aligned properly with component 48 (i.e., when camera 56 detects that hole 38 is aligned with lens 40 or when camera 56 detects that alignment marks or other alignment features on the workpiece components are aligned as desired), actuator 52 may be directed to press component 36 downwards (in the FIG. 4 example), thereby compressing structure 42 between the opposing surfaces of components 36 and 48 and forming an adhesive bond.

As shown in FIG. 4, structure 42 may include substrate 42B (e.g., a flexible polymer sheet that serves as a tape substrate) and adhesive coating layers 42A and 42C. When components 36 and 48 are forced together by actuator 52 (or by manual manipulation of the workpiece components), components 36 and 48 become attached to each other. The shape of structure 42 also forms a dam that contains the movement of liquid material 46. In the FIG. 4 example, liquid material 46 (e.g., liquid adhesive) has been placed on the outside of structure 42. Structure 42 may have a ring shape as shown in FIG. 3). When components 36 and 48 are pressed towards each other, liquid material 46 will flow along the exposed surface of components 36 and 48, coating these surfaces in preparation for formation of a bond. The outer edge 44 of structure 42 prevents undesired movement of liquid material 46.

The adhesive nature of structure 42 serves to prevent undesired movement of components 36 and 48 relative to each other while liquid material 46 is still in its liquid state. This ensures that components 36 and 48 will not be misaligned laterally (horizontally in the view of FIG. 4) and will not be misaligned rotationally (tilted off of the horizontal axis in the view of FIG. 4). Rotational and lateral alignment in other planes (i.e., a plane perpendicular to the page of FIG. 4) may also be ensured.

While the positions of components 36 and 48 are fixed with respect to each other by structure 42, tool 50 may form a solid out of liquid material 46. Tool 50 may, for example, using bonding tool 58 to apply ultraviolet light, heat, etc. Bonding tool 58 may use these techniques to cure liquid adhesives and/or to reflow solder paste. Following cooling to room temperature (if elevated temperatures were involved), the liquid material 46 will solidify (e.g., to form a properly aligned adhesive joint or to form a properly aligned solder joint).

Figure 5:
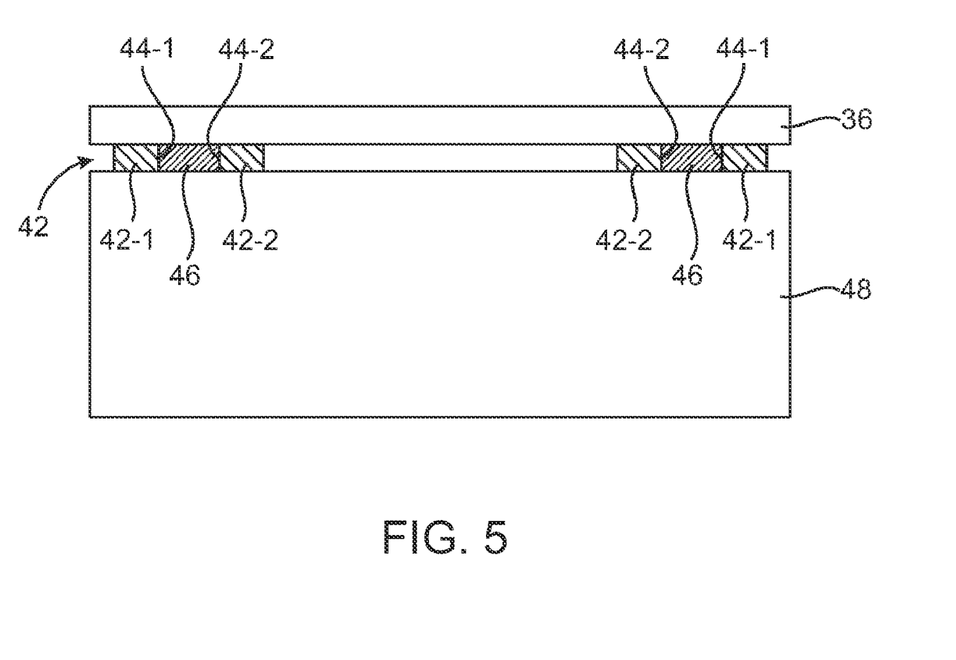
FIG. 5 is a cross-sectional side view of another illustrative arrangement for containing liquid material and maintaining part alignment during assembly operations in accordance with an embodiment of the present invention.

As shown in the example of FIG. 5, structure 42 may have multiple parts such as outer ring part 42-1 and inner ring part 42-2. This allows liquid material 46 (e.g., liquid adhesive or solder) to be confined in multiple dimensions. For example, by use of an outer ring and an inner ring for structure 42, liquid material 46 may be confined to a ring shape having its outer edge bounded by inner edge 44-1 of outer ring 42-1 and having its inner edge bounded by outer edge 44-2 of inner ring 44-2.

Figure 6:
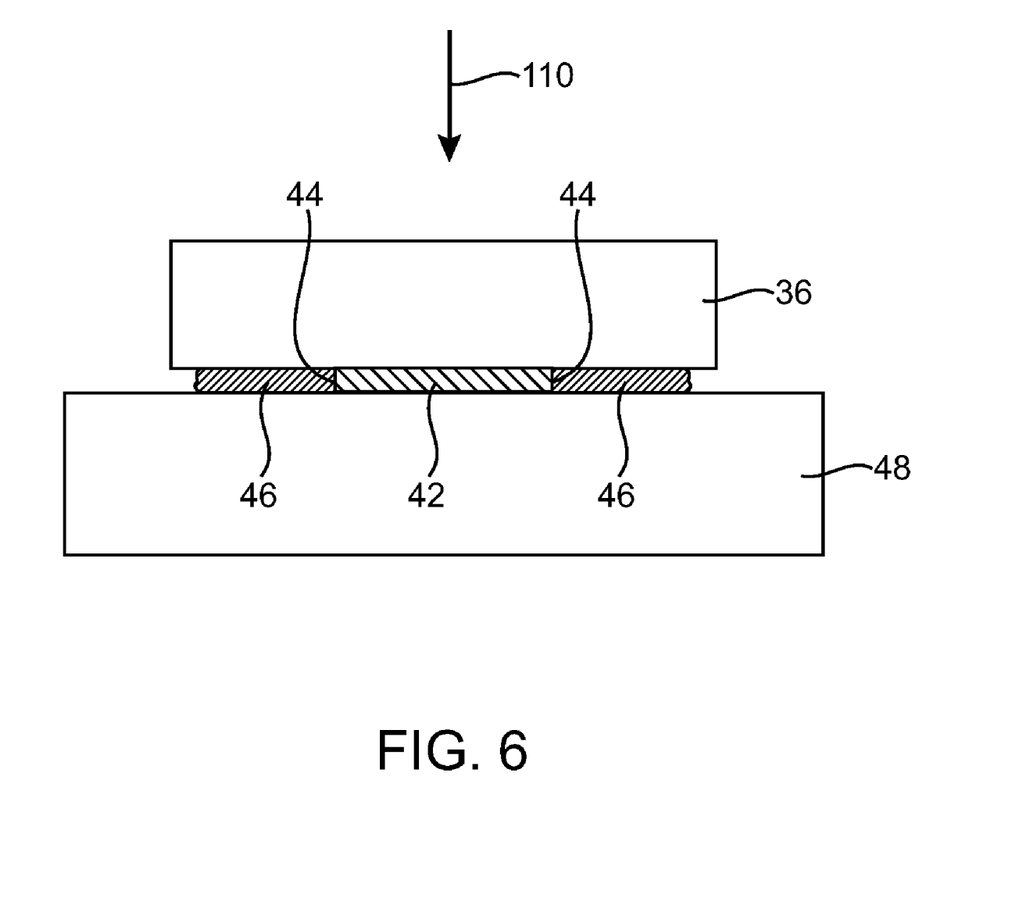
FIG. 6 is a cross-sectional side view of an arrangement for preventing liquid material from intruding inwards into a given area between two parts while maintaining alignment between the parts during assembly operations in accordance with an embodiment of the present invention.

FIG. 6 is a cross-sectional side view of a workpiece showing how components 36 and 48 may be attached by a solid structure. Structure 42 in the FIG. 6 arrangement has a solid shape (e.g., a circle or rectangle when viewed from direction 110) with a single outer edge 44 around its periphery. This type of structure may be used to prevent inward movement of liquid material 46.

Figure 7:
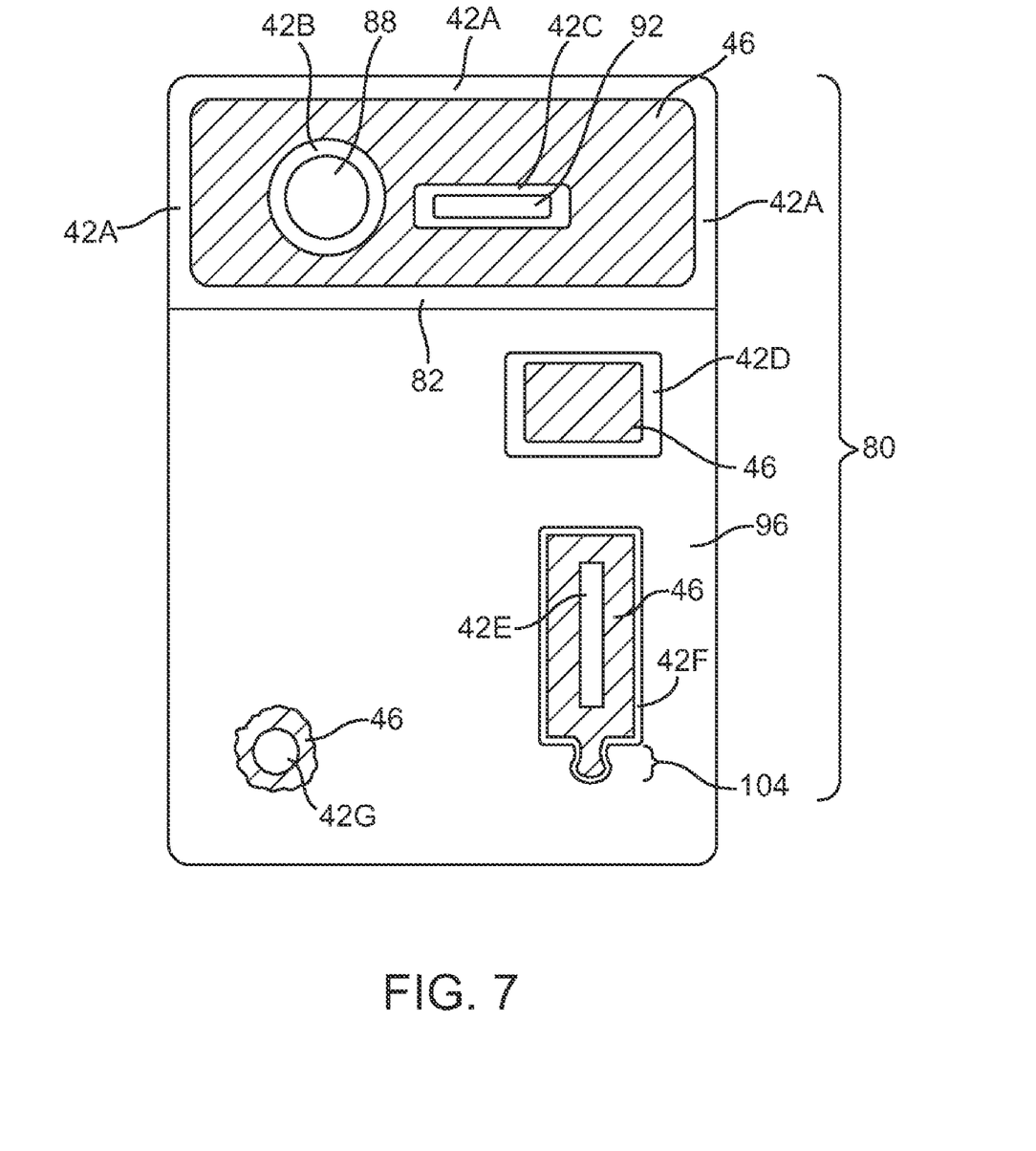
FIG. 7 is a top view showing illustrative arrangements that may be used for constraining the flow of liquid material and maintaining part alignment during assembly operations in accordance with an embodiment of the present invention.

FIG. 7 is a top view of an illustrative electronic device (device 80) showing different types of patterns that may be used for structure 42 (which is shown as structures 42A, 42B, 42C, 42D, 42E, 42F, and 42G in FIG. 7). Device 80 may include a first component (e.g., a housing structure or other suitable structure) and a second component (e.g., a cover glass or other suitable structure) that are joined using structures such as structures 42A, 42B, 42C, 42D, 42E, 42F, and 42G and liquid material 46 (e.g., solder or liquid adhesive).

Structure 42A forms a rectangular ring that contains liquid material 46 within an inner rectangular region.

Structure 42B forms a circular ring that prevents liquid material 46 from entering interior area 88.

Structure 42C is an example of a rectangular ring that prevents liquid material 46 from entering interior rectangular region 92.

Structure 42D is a rectangular ring that contains liquid material 46 within its interior, so that the contained liquid material does not flow outwards into exterior 96.

Structures 42E and 42F work together to form a ring-shaped containment area for liquid material 46. As illustrated by overflow structure 104, any of structures 42 may, if desired, be provided with shapes that help accommodate the flow of excessive liquid material 46. Overflow structures may take the form of additional liquid reservoirs, wavy edges, etc.

Structure 42G is a solid central structure (as with the example of FIG. 6) that prevents liquid material 46 from intruding inwardly.

The foregoing is merely illustrative of the principles of this invention and various modifications can be made by those skilled in the art without departing from the scope and spirit of the invention. The foregoing embodiments may be implemented individually or in any combination.

What is claimed is:

1. Apparatus, comprising:
   a first component;
   a second component;
   liquid material that has associated liquid and solid states; and
   a structure with a substrate and adhesive that attaches the first component to the second component, wherein the structure has at least one edge adjacent to the liquid material that is configured to block flow of the liquid material in its liquid state, wherein the structure has a ring shape with an overflow structure.

2. The apparatus defined in claim 1 wherein the structure comprises a double-sided tape structure.

3. The apparatus defined in claim 1 wherein the substrate comprises a polymer.

4. The apparatus defined in claim 1 wherein the substrate comprises a flexible sheet.

5. The apparatus defined in claim 1 wherein the substrate comprises a flexible polymer sheet having a top surface that is coated with the adhesive and having a bottom surface that is coated with the adhesive.

6. The apparatus defined in claim 5 wherein the edge comprises an outer peripheral edge for the structure and wherein the liquid material surrounds the structure.

7. The apparatus defined in claim 5 wherein the edge comprises an inner peripheral edge for the structure and wherein the liquid material is surrounded by the structure.

8. The apparatus defined in claim 5 wherein the structure has a rectangular ring shape.

9. The apparatus defined in claim 5 wherein the structure has a circular ring shape.

10. The apparatus defined in claim 1 wherein the first component comprises a camera module and wherein the second component comprises a trim member.

11. The apparatus defined in claim 1 wherein the liquid material comprises liquid adhesive.

12. The apparatus defined in claim 1 wherein the liquid material comprises solder.

13. Apparatus, comprising:
    a first component;
    a second component;
    a double-sided tape between the first and second components that attaches the first component to the second component; and
    liquid adhesive between the first and second components adjacent to the double-sided tape, wherein the double-sided tape has an edge and wherein the edge blocks movement of the liquid adhesive, wherein the first component comprises a camera module and the second component comprises a trim.

14. The apparatus defined in claim 13 wherein the liquid adhesive comprises cured and solidified liquid adhesive that attaches the first component to the second component.

15. The apparatus defined in claim 13 wherein the double-sided tape has a ring shape with an overflow structure.

16. The apparatus defined in claim 13 wherein the double-sided tape comprises an inner ring of double-sided tape and an outer ring of double-sided tape and wherein the liquid adhesive is interposed between the inner and outer rings of double-sided tape.

17. An electronic device, comprising:
    a first component;
    a second component;
    a structure with a substrate and adhesive that attaches the first component to the second component, wherein the structure comprises an inner ring, an outer ring, and an overflow structure; and
    liquid material interposed between the inner ring and the outer ring, wherein the liquid material has associated liquid and solid states and wherein the structure is configured to block flow of the liquid material in its liquid state.

18. The electronic device defined in claim 17 wherein the inner ring comprises an inner ring of double-sided tape and wherein the outer ring comprises an outer ring of double-sided tape.

19. The electronic device defined in claim 17 wherein the liquid material comprises molten solder.

20. The electronic device defined in claim 17 wherein the liquid material comprises ultraviolet-light-cured adhesive.

* * * * *